United States Patent
Jamadagni et al.

(10) Patent No.: US 11,482,243 B2
(45) Date of Patent: Oct. 25, 2022

(54) SYSTEM AND METHOD FOR AUTOMATICALLY IDENTIFYING AND RANKING KEY MOMENTS IN MEDIA

(71) Applicant: PRIME FOCUS TECHNOLOGIES LIMITED, Bengaluru (IN)

(72) Inventors: Suhas Kodandaram Jamadagni, Mysuru (IN); Muralidhar Kolar Sridhar, Bengaluru (IN); Nagaraju Surisetty, Kadapa (IN); Adrish Bera, Bengaluru (IN)

(73) Assignee: PRIME FOCUS TECHNOLOGIES LIMITED, Karnataka (IN)

( * ) Notice: Subject to any disclaimer, the term of this patent is extended or adjusted under 35 U.S.C. 154(b) by 0 days.

(21) Appl. No.: 17/343,400

(22) Filed: Jun. 9, 2021

(65) Prior Publication Data
US 2022/0270634 A1    Aug. 25, 2022

(30) Foreign Application Priority Data
Feb. 22, 2021 (IN) .............................. 202141007400

(51) Int. Cl.
| | | |
|---|---|---|
| G11B 27/19 | (2006.01) | |
| G11B 27/34 | (2006.01) | |
| G10L 25/57 | (2013.01) | |
| G11B 27/00 | (2006.01) | |

(52) U.S. Cl.
CPC .............. *G10L 25/57* (2013.01); *G11B 27/19* (2013.01); *G11B 27/34* (2013.01)

(58) Field of Classification Search
USPC ................ 386/278, 280, 281, 286, 291, 239
See application file for complete search history.

(56) References Cited

U.S. PATENT DOCUMENTS

| | | | | |
|---|---|---|---|---|
| 7,424,204 B2* | 9/2008 | Nakamura | .......... | G06F 16/7834 386/248 |
| 7,480,445 B2* | 1/2009 | Yamamoto | ........... | G11B 27/034 386/248 |
| 7,796,857 B2* | 9/2010 | Hiroi | .................... | G11B 27/105 386/248 |
| 8,009,966 B2* | 8/2011 | Bloom | .................. | G11B 27/10 386/285 |
| 2011/0016077 A1* | 1/2011 | Vasilache | ................ | G10L 25/78 706/52 |
| 2020/0043468 A1* | 2/2020 | Willett | .................. | G06N 3/082 |

* cited by examiner

*Primary Examiner* — Daquan Zhao
(74) *Attorney, Agent, or Firm* — Barry Choobin; Patent 360 LLC

(57) ABSTRACT

A system including a key moments engine (KME) and a method for automatically identifying and ranking key moments in a media asset. The KME extracts an audio stream from the media asset and stores the audio stream as an audio file. The KME divides the audio file into sub-second audio segments. The KME computes an audio signal level for each of the sub-second audio segments and generates an array of audio signal levels for the audio file. The KME generates clusters of the audio signal levels from the array of audio signal levels. The KME dynamically determines threshold levels for classifying the audio signal levels in the array using the clusters. The KME identifies the key moments from the classified audio signal levels and computes a rank for each of the identified key moments based on ranking criteria.

24 Claims, 7 Drawing Sheets

SYSTEM AND METHOD FOR AUTOMATICALLY IDENTIFYING AND RANKING KEY MOMENTS IN MEDIA

CROSS-REFERENCE TO RELATED APPLICATIONS

This application claims priority to and the benefit of the non-provisional patent application titled "System and Method for Automatically Identifying and Ranking Key Moments in Media", application number 202141007400, filed in the Indian Patent Office on Feb. 22, 2021. The specification of the above referenced patent application is incorporated herein by reference in its entirety.

BACKGROUND

Technical Field

The embodiments herein, in general, relate to media processing. More particularly, the embodiments herein relate to a system and a method for automatically identifying and ranking key moments in media.

Description of the Related Art

With the advancements in movie making technologies, the amount of media content, for example, video content, created on a daily basis has grown exponentially. For these large amounts of media assets, for example, videos, to reach their targeted audience, media houses have to create short promotional videos, for example, promos or trailers, and distribute them across the globe as fast as possible to gain momentum and advantage over their competition. Creating a promotional video is typically performed by a manual process of watching a video, identifying and marking important or interesting parts or segments to be spliced into a trailer, cutting these parts or segments out of the video for inclusion in the trailer, and editing the trailer manually. To cater to different groups of audiences, multiple trailers need to be created, which require repeating the above-mentioned manual process multiple times. This repetition is time consuming and tedious as it involves a person meticulously watching the video, noting down interesting segments of the video, extracting the interesting segments, and then splicing the interesting segments together to create a final trailer. Therefore, there is a need for an automated system and method that substantially eases video browsing and expensive supervision requirements by automatically identifying these interesting segments, also referred to as "key moments", in the video to be used in the creation of a trailer.

In addition to identifying the key moments in the video, a user would also need to identify an optimal video segment to use for the trailer. The aid of an expert would be required for identifying and extracting frame-accurate video segments and stitching these frame-accurate video segments into the trailer, which is time consuming as it requires multiple viewings of the video and assessments of the video segments for quality. When a video segment containing key moments needs to be extracted from the video for marketing and syndication purposes, a marketing team would need to watch the video, identify video segments containing key moments, and then request an editor to have these video segments edited, packaged, and then distributed, which is time consuming and may not necessarily ensure that the best video segment is selected. Conventional methods for identifying key moments are either manual or rely substantially on deep neural networks and operate on a visual side, which requires a large amount of processing power to operate and a graphics processing unit (GPU) to train a model on a large dataset.

Hence, there is a long-felt need for a system and a method for automatically identifying and ranking key moments in media, while addressing the above-recited problems associated with the related art.

OBJECTS OF THE EMBODIMENTS HEREIN

An object of the embodiments disclosed herein is to provide a system and a method for automatically identifying and ranking key moments in media.

Another object of the embodiments disclosed herein is to use artificial intelligence for automatically identifying key moments in media assets, for example, videos, and marking and ranking video segments containing the key moments in the videos.

Yet another object of the embodiments disclosed herein is to use an audio stream in a media asset, for example, a video, for identifying key moments based on audio patterns, and then to use a string of ranking criteria comprising, for example, presence of actors determined from a reference database of key actors created from across different videos, their importance, a change in audio levels, presence of key visual features, etc., for ranking the key moments.

Yet another object of the embodiments disclosed herein is to execute a clustering algorithm for generating clusters of audio signal levels from audio segments, and to use these clusters to dynamically determine threshold levels for classifying the audio signal levels, thereby ensuring optimal treatment of videos that are laden with substantial audio content, for example, music-heavy videos, having different threshold levels as compared to videos that use music only for dramatic effect.

Yet another object of the embodiments disclosed herein is to execute rule-based processing of audio events in media assets to account for audio segments that are commonly responsible for false positives in the identification of key moments.

Yet another object of the embodiments disclosed herein is to execute a rule-based ranking algorithm for ranking the identified key moments and accounting for false positives in the identification of key moments.

The objects disclosed above will be realized and achieved at least by the elements, features, and combinations particularly pointed out in the claims. The objects disclosed above have outlined, rather broadly, the features of the embodiments disclosed herein in order that the detailed description that follows is better understood. The objects disclosed above are not intended to determine the scope of the claimed subject matter and are not to be construed as limiting of the embodiments disclosed herein. Additional objects, features, and advantages of the embodiments herein are disclosed below. The objects disclosed above, which are believed to be characteristic of the embodiments disclosed herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments disclosed herein address the above-recited needs for a system and a method for automatically identifying and ranking key moments in media. In an embodiment, the system disclosed herein comprises a plurality of processors, a non-transitory, computer-readable storage medium operably and communicatively coupled to the processors, and a key moments engine. The key moments engine is configured to define computer program instructions executable by at least one of the processors for automatically identifying and ranking key moments in a media asset. In the method disclosed herein, the key moments engine extracts an audio stream from the media asset, for example, a video, and stores the audio stream as an audio file. The key moments engine divides the audio file into sub-second audio segments. The key moments engine computes an audio signal level for each of the sub-second audio segments and generates an array of audio signal levels for the audio file. In an embodiment, the audio signal level is measured in decibels relative to full scale (dBFS). The key moments engine generates clusters of the audio signal levels from the array of audio signal levels. The key moments engine is configured to execute at least one of a plurality of clustering algorithms, for example, a k-means clustering algorithm, for generating the clusters of the audio signal levels. In an embodiment, the key moments engine stores the audio signal level as an absolute value of the audio signal level for the generation of the clusters free of errors. The key moments engine dynamically determines threshold levels for classifying the audio signal levels in the array using the clusters. The key moments engine classifies the audio signal levels, for example, as high audio signal levels, or medium audio signal levels, or low audio signal levels.

The key moments engine identifies the key moments from the classified audio signal levels as follows. In an embodiment, the key moments engine analyzes the classified audio signal levels comprising an array of events. The key moments engine identifies a medium one of the classified audio signal levels or a high one of the classified audio signal levels as a starting point of each of the events. The key moments engine identifies an end point of each of the events on detecting a low one of the classified audio signal levels in the array. The key moments engine processes the events for identifying the key moments by performing one or more of the following steps: (a) discarding events containing only medium audio signal levels and low audio signal levels, from the array of events; (b) discarding events that overlap boundaries of accompanying elements of the media asset, from the array of events, where the accompanying elements of the media asset comprise, for example, songs, start credits, and end credits of the media asset; (c) merging one or more of the events that are closer to each other in relation to a predetermined duration; and (d) discarding events that are short in duration from the array of events. In an embodiment, the key moments engine processes events with non-distinguishable audio signal levels for the identification of the key moments.

In an embodiment, the key moments engine creates a dictionary for each of the identified key moments for storing the audio signal levels of audio segments in each of the identified key moments, and a start time code and an end time code of an event defining each of the identified key moments. The dictionary comprises shots that fall inside each of the identified key moments.

The key moments engine computes a rank for each of the identified key moments based on ranking criteria. The ranking criteria comprise, for example, one or more of variations in the audio signal levels of the identified key moments, presence of one or more key actors in the media asset determined using a reference database of key actors, presence of scenes of interest in the media asset, and an average audio signal level of each of the identified key moments.

In an embodiment, the key moments engine represents each of the identified key moments using a start time code and an end time code. In an embodiment, the key moments engine adjusts the start time code and the end time code of each of the identified key moments to boundaries of shots of the media asset to enhance a visual representation of the identified key moments. In an embodiment, the key moments engine discards fringe shots that end just before the start time code of each of the identified key moments and fringe shots that start just after the end time code of each of the identified key moments. In an embodiment, the key moments engine generates a report comprising an audio plot of each of the identified key moments and the shots in each of the identified key moments, the computed rank of each of the identified key moments, and a start time code and an end time code of each of the identified key moments.

In one or more embodiments, related systems comprise circuitry and/or programming for executing the methods disclosed herein. In an embodiment, the circuitry and/or programming are any combination of hardware, software, and/or firmware configured to execute the methods disclosed herein depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

The specific features of the embodiments herein are illustrated in some drawings and not in others for convenience only as each feature may be combined with any or all of the other features in accordance with the embodiments herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
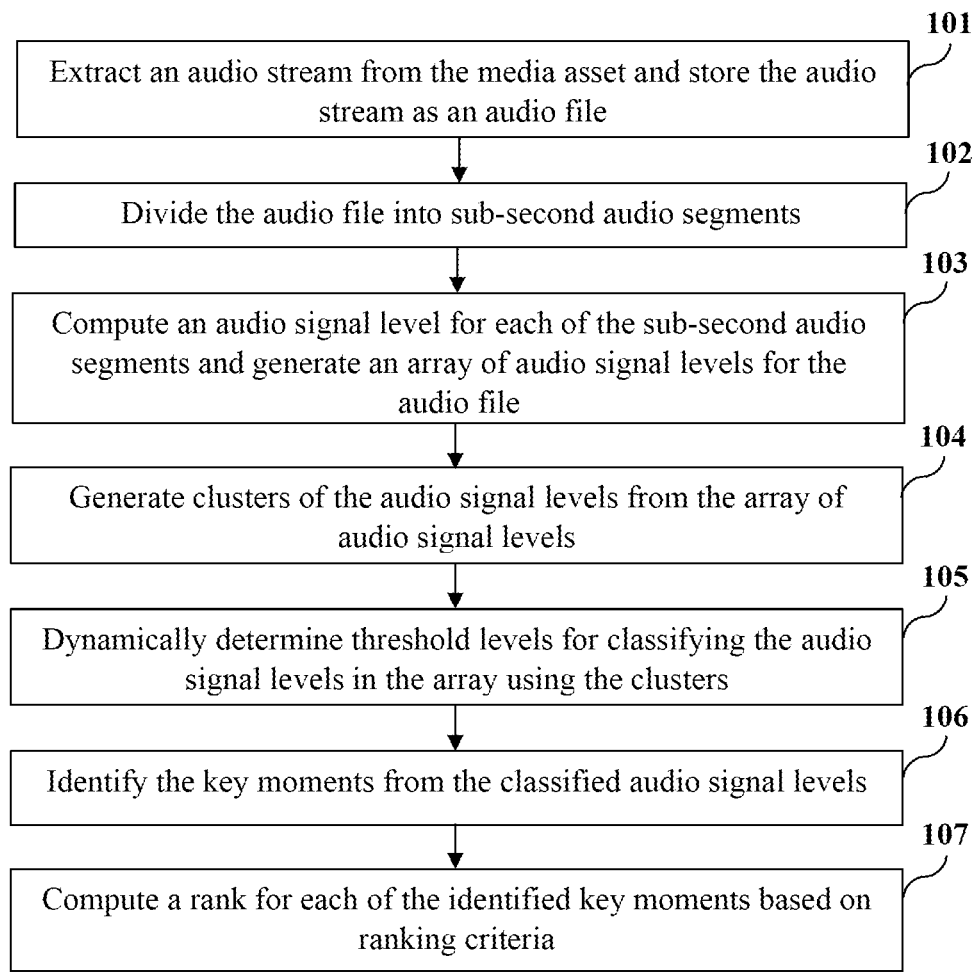
FIG. 1 illustrates a flowchart of a method for automatically identifying and ranking key moments in a media asset, according to an embodiment herein.

FIG. 1 illustrates a flowchart of a method for automatically identifying and ranking key moments in a media asset, according to an embodiment herein. As used herein, "media asset" refers to a digital asset comprising media content, for example, audio content, image content, video content, audiovisual content, multimedia content, animations, textual content, sound effects, visual effects, graphics, etc., or any combination thereof. A media asset, for example, a video is typically composed of multiple scenes, each of which is composed of shots. Each of these shots is a sequence of interrelated frames captured contiguously by a single image capture device in a particular time period. Each shot represents a continuous action in time and space. In an embodiment, the method disclosed herein employs a key moments engine configured to define computer program instructions executable by one or more processors for automatically identifying and ranking key moments in a media asset using artificial intelligence (AI). In an embodiment, the key moments engine is configured as an AI engine.

In the method disclosed herein, the key moments engine extracts 101 an audio stream from the media asset, for example, a video, and stores the audio stream as an audio file. The key moments engine divides 102 the audio file into sub-second audio segments. The key moments engine computes 103 an audio signal level for each of the sub-second audio segments and generates an array of audio signal levels for the audio file as disclosed in the detailed description of FIG. 2. In an embodiment, the audio signal level is measured in decibels relative to full scale (dBFS). The key moments engine generates 104 clusters of the audio signal levels from the array of audio signal levels. The key moments engine is configured to execute at least one of a plurality of clustering algorithms, for example, a k-means clustering algorithm, for generating the clusters of the audio signal levels as disclosed in the detailed description of FIG. 2. In an embodiment, the key moments engine is configured to execute other clustering algorithms, for example, a density-based spatial clustering of applications with noise (DBSCAN) algorithm, a hierarchical clustering algorithm such as an agglomerative clustering algorithm, etc., for generating the clusters of the audio signal levels. In an embodiment, the key moments engine stores the audio signal level as an absolute value of the audio signal level for the generation of the clusters free of errors as disclosed in the detailed description of FIG. 2. The key moments engine dynamically determines 105 threshold levels for classifying the audio signal levels in the array using the clusters as disclosed in the detailed description of FIG. 2. The key moments engine classifies the audio signal levels, for example, as high audio signal levels, or medium audio signal levels, or low audio signal levels.

The key moments engine identifies 106 the key moments from the classified audio signal levels as follows. In an embodiment, the key moments engine analyzes the classified audio signal levels comprising an array of events. The key moments engine identifies a medium one of the classified audio signal levels or a high one of the classified audio signal levels as a starting point of each of the events. The key moments engine identifies an end point of each of the events on detecting a low one of the classified audio signal levels in the array. The key moments engine processes the events for identifying the key moments by performing one or more of the following steps: (a) discarding events containing only medium audio signal levels and low audio signal levels, from the array of events; (b) discarding events that overlap boundaries of accompanying elements of the media asset, from the array of events, where the accompanying elements of the media asset comprise, for example, songs, start credits, and end credits of the media asset; (c) merging one or more of the events that are closer to each other in relation to a predetermined duration; and (d) discarding events that are short in duration from the array of events. In an embodiment, the key moments engine processes events with non-distinguishable audio signal levels for the identification of the key moments. For example, the key moments engine marks interesting segments such as romantic scenes that do not have distinguishable audio signal levels, as events for the identification of key moments. In another example, the key moments engine marks scenes that depict famous monuments or locations but do not have distinguishable audio signal levels as events for the identification of key moments.

In an embodiment, the key moments engine creates a dictionary for each of the identified key moments for storing the audio signal levels of audio segments in each of the identified key moments, and a start time code and an end time code of an event defining each of the identified key moments. The dictionary comprises shots that fall inside each of the identified key moments.

Figure 4:
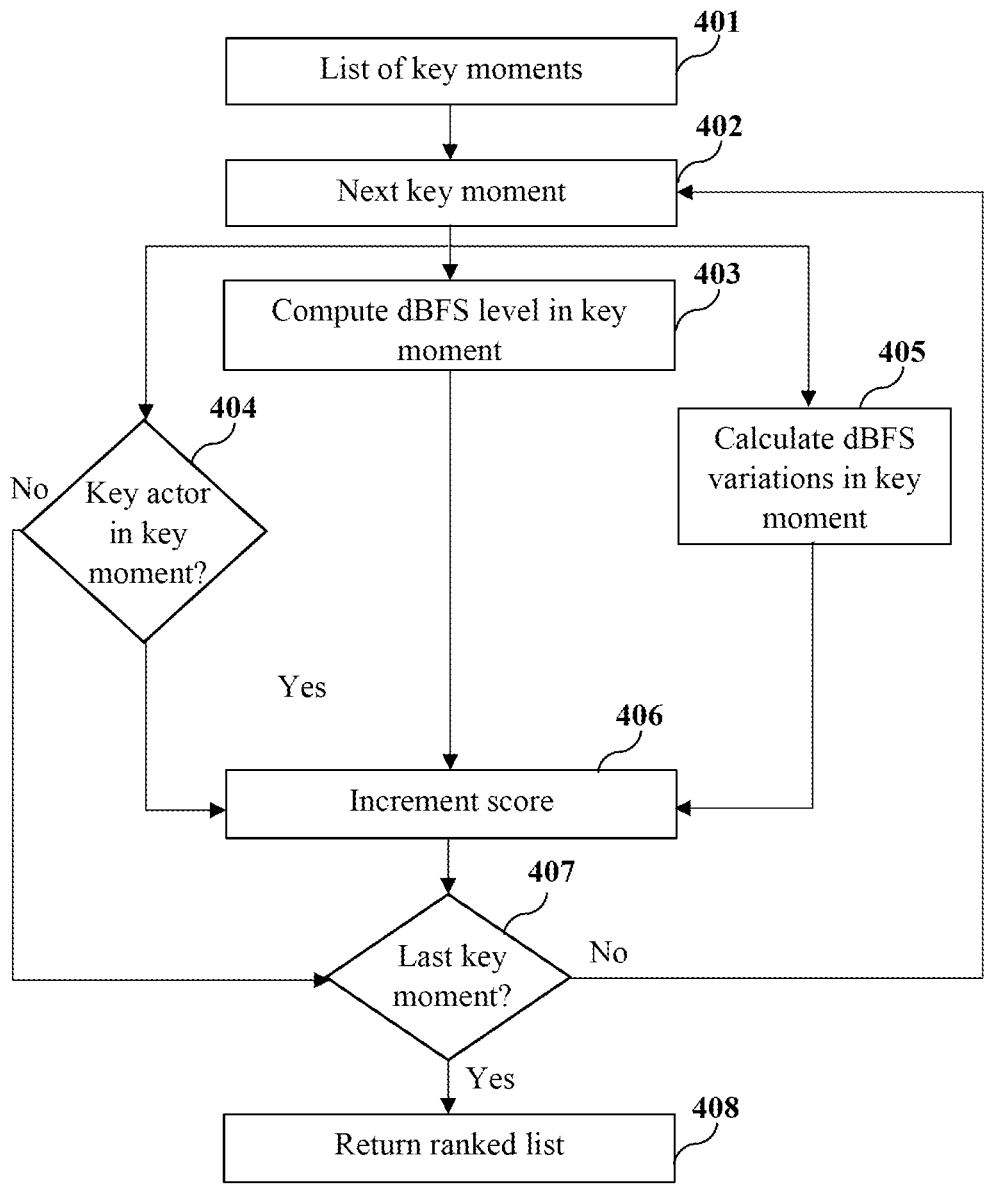
FIG. 4 illustrates a flowchart of a method for automatically ranking key moments identified in a video, according to an embodiment herein.

The key moments engine computes 107 a rank for each of the identified key moments based on ranking criteria as disclosed in the detailed description of FIG. 4. The ranking criteria comprise, for example, one or more of variations in the audio signal levels of the identified key moments, presence of one or more key actors, for example, protagonists, antagonists, celebrities playing cameos, etc., in the media asset determined using a reference database of key actors, presence of scenes of interest such as romantic scenes, scenes with popular landmarks, monuments, locations, etc., in the media asset, and an average audio signal level of each of the identified key moments. Each of the ranking criteria adds weight to the score computed for each key moment. For example, the key moments engine increments the score computed for a key moment comprising interesting segments such as romantic scenes, explosions, etc., to rank this key moment higher than those key moments without these interesting segments. In another example, the key moments engine increments the score computed for a key moment comprising landmark segments such as famous monuments, locations, etc., to rank this key moment higher than those key moments without these landmark segments.

In an embodiment, the key moments engine represents each of the identified key moments in the form of a start time code and an end time code. In an embodiment, the key moments engine adjusts the start time code and the end time code of each of the identified key moments to boundaries of shots of the media asset to enhance a visual representation of the identified key moments. In an embodiment, the key moments engine discards fringe shots that end just before the start time code of each of the identified key moments and fringe shots that start just after the end time code of each of the identified key moments. In an embodiment, the key moments engine generates a report comprising an audio plot of each of the identified key moments and the shots in each of the identified key moments as exemplarily illustrated in FIGS. 7A-7B, the computed rank of each of the identified key moments, and a start time code and an end time code of each of the identified key moments.

Figure 2:
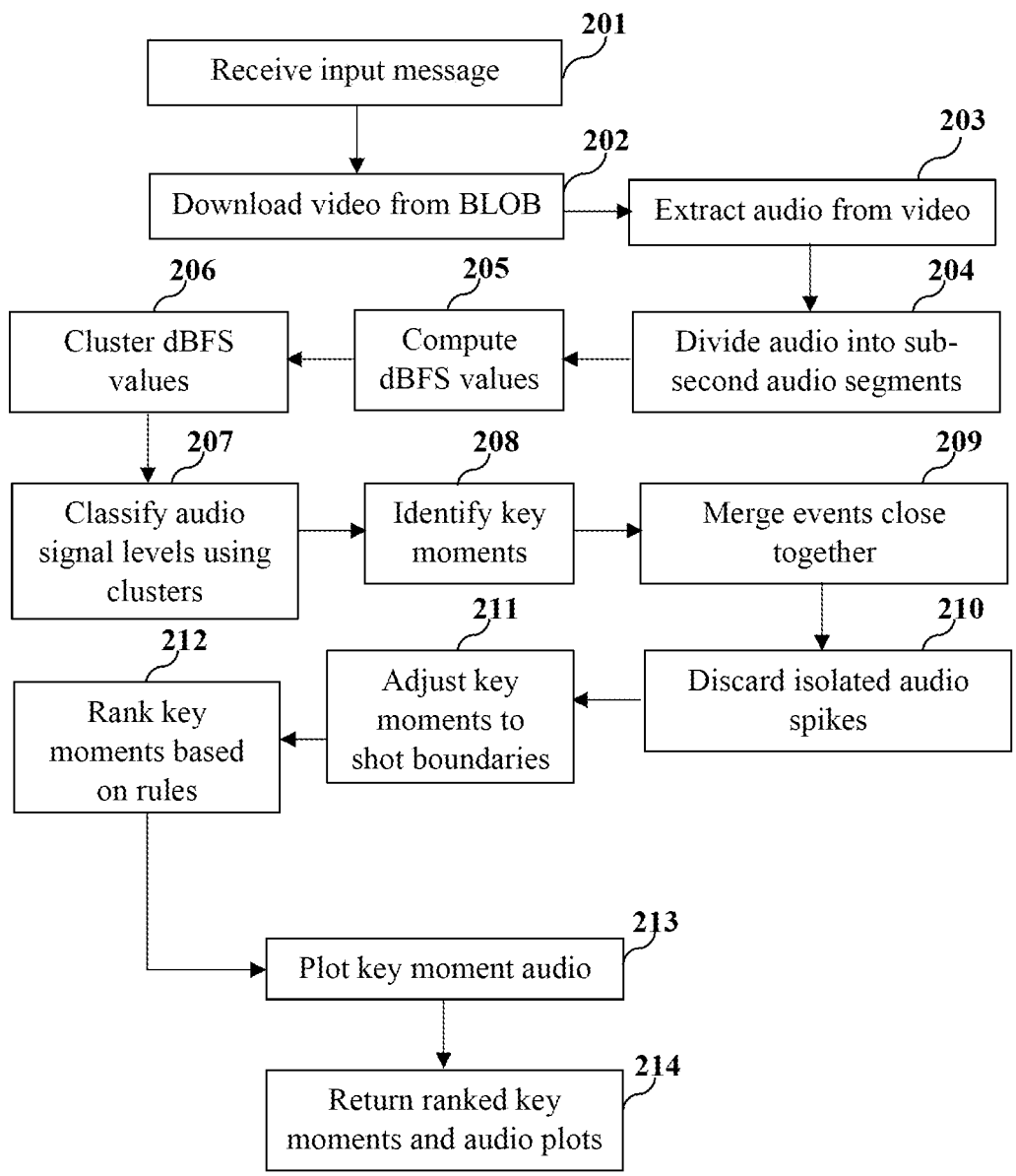
FIG. 2 illustrates a flowchart of an exemplary implementation of a method for automatically identifying and ranking key moments in a video, according to an embodiment herein.

FIG. 2 illustrates a flowchart of an exemplary implementation of a method for automatically identifying and ranking key moments in a video, according to an embodiment herein. In the method disclosed herein, the key moments engine receives 201 an input message requesting for identification and ranking of key moments in a video. The input message comprises relevant data, for example, one or more links to download media content, for example, video content streamed from a distributed streaming platform such as the Apache Kafka® platform, and process details. The key moments engine parses the Kafka® message with the relevant data for downloading the video file to be processed. The key moments engine downloads 202 the video file, for example, from one or more binary large objects (BLOBs) stored in one or more databases of the Kafka® platform. The key moments engine extracts 203 an audio stream from the video, for example, as a 16-bit waveform audio file format (WAV), to be used for the key moment identification process. An example representation of a Kafka® message comprising the relevant data for the key moment identification process is disclosed below.
{"jobName":"assetname 071020","sourceVideoFile":"path/to/cloudlvideo.mp4","cloudAcces sTokens":"accessToken", "restApiUrl":"https://api_url_for_sending_job_response", "restApiToken":"rest access_token"}

In an embodiment, the key moments engine stores the extracted audio stream in the same directory as the video file with the same name as the video file. When the audio stream is extracted from the video file, the key moments engine divides 204 the audio stream into sub-second audio segments, for example, of 250 milliseconds each, and stores the sub-second audio segments as an array of small audio files. The key moments engine iterates through the array of small audio files and computes 205 an audio signal level, for example, a decibels relative to full scale (dBFS) value for each sub-second audio segment. In an embodiment, the key moments engine computes the dBFS value for each sub-second audio segment, for example, using the following formula: dBFS=20 log(average value/maximum value), where "average value" refers to the averaged value of audio in each sub-second audio segment, and "maximum value" refers to the maximum possible value that the audio can accommodate, for example, (2^16) for a 16-bit audio. As these dBFS values are typically in the negative, the key moments engine stores the absolute value of each of the dBFS values for further computations.

Each dBFS value ranges from 0 to negative infinity (−∞) with a floating decimal point representation. When there is a sudden change in the audio, the dBFS value results in either 0 or negative infinity. To preclude erroneous clustering in subsequent processing steps resulting from the use of negative dBFS values, the key moments engine replaces a dBFS value ranging from 0 to negative infinity with the most recent valid dBFS value, that is, the absolute value. The key moments engine stores these dBFS values as an array with the same length as the array with the sub-second audio segments, thereby corresponding each dBFS value to its respective indexed sub-second audio segment. An example representation of an array of sub-second audio segments where the audio file is sampled at 44000 samples per second and a 250-millisecond audio segment comprises 11000 samples is disclosed below.
[[−6, 16, −4, 20, 7, 13, 3, 11, −6, 14, −3, 5, −3, 0, −12, 1, −18, −10, −19, −17, −23, −19, −33, −30, −41, −35, −37, −34, −33,−40, −44, −40, −43, −37, −30, −40, −40, −36, −55, −38, −46, −46, −34, −35, −32, −26, −26, −34, −22, −33, −17, −22, −8, −18, −13, −17, −12, −15, 4, −7, 7, 4, 4, 0, . . . −61, 7, −27, 36, 8, 62, −1, 38, −31, 14, −42, 27, −47, 31, −58, 11, −36, 10, 5, 30, 4, 39, −17, 37, −25, 24, −34, −5, −40, −30, −39, −44, −41, −50, −23, −42, 2, −35], [8, −36, 22, −29, 40, −28, 33, −39, 32, −31, 37, −14, 21, −24, 13, −42, 28, −35, 24, −16, −3, −11, −16, −14, −5, −12, 18, 1, 47, 30, 68, 55, 75, 48, 84, 35, 88, 37, 68, 32, 60, 30, 87, 48, 113, 59, 115, 63, 99, 70, 71, 59, 63, 43, 91, 55, 116, 70, 103, 54, 73, 31, 60, 28, 59, 36, 56, 42, . . . −177, −247, −185, −206, −208, −123, −154, −77, −93, −54, −75, 41, −41, 111, −26, 105, −23, 156, 60, 232, 124, 236, 96, 241, 128, 232, 187, 159, 129, 158, 77], [198, 108, 94, 89, −54, 25, −70, −9, −39, −42, −77, −74, −148, −82, −166, −100, −143, −159, −162, −224, −198, −209, −179, −141, −105, −113, −28, −97, −32, −66, −83, −29, −7, 54, 119, 108, 129, 105, 109, 175, 82, 213, 4, 87, −4, 11, −1, 35, −96, −8, −128, −80, −79, −133, −87, −170, −114, . . . −180, −130, −182, −130, −196, −138, −217, −123, −195, −79, −142, −42, −112, −14, −100, 25, −72, 89, −26, 148, 6, 160, 8, 134, 20, 85, 41, 16, 21, −17, −2, 4, 17], [−7, 24, −43, 9, −36, 10, −12, 5, 7, −4, 52, 22, 93, 48, 79, 31, 25, 5, −11, 22, −1, 74, 8, 85, −23, 39, −37, 27, −21, 57, −31, 47, −43, 21, −29, 31, −44, 32, −93, −3, −130, −40, −126, −36, −79, 22, −38, 69, −10, 80, 64, 122, 123, 165, 102, 147, 103, 148, 144, 174, 139, 150, 131, 136, . . . −69, −1, −86, −35, −130, −49, −160, −56, −173, −79, −182, −94, −170, −71, −153, −52, −147, −51, −124, −26, −111, 4, −118, 9, −96, 29, −64, 56, −41, 77, 20, 117], [80, 132, 87, 115, 101, 127, 132, 128, 131, 83, 119, 53, 112, 26, 86, −12, 59, −25, 54, −50, 56 −112, 36, −150, 0, −179, −22, −236, −44, −283, −79, −306, −90, −329, −95, −352, −117, −356, −104, −340, −72, −333, −78, −340, −79, −319, −53, −279, −47, −248, −53, −214, −68, −187, −109, . . . −62, −63, −83, −72, −78, −106, −31, −126, −37, −101, −87, −61, −80, −56, −16, −68, 53, −84, 84, −104, 40, −101, −47, −77, −112, −64, −148, −32, −184, 5, −225], [−27, −229, −85, −184, −76, −182, −32, −229, −33, −208, −75, −153, −101, −172, −107, −187, −137, −119, −170, −44, −148, 4, −120, 56, −116, 97, −67, 115, 18, 122, 59, 154, 68, 235, 78, 306, 83, 328, 107, 338, 161, 334, 207, 303, 226, 299, 218, 312, 204, 269, 223, 189, 271, 123, 301, 84, . . . 1431, 1738, 1325, 1799, 1307, 1884, 1377, 1942, 1410, 1981, 1391, 1957, 1341, 1886, 1283, 1861, 1264, 1859, 1255, 1830, 1210, 1776, 1145, 1716, 1067, 1697, 993], [1702, 965, 1689, 1002, 1714, 1100, 1750, 1204, 1708, 1251, 1678, 1284, 1761, 1324, 1888, 1323, 1972, 1319, 1953, 1349, 1855, 1328, 1820, 1252, 1884, 1216, 1932, 1238, 1926, 1307, 1905, 1416, 1854, 1481, 1785, 1474, 1769, 1488, 1791, 1512, 1759, 1487, 1692, 1468, 1655, 1451, 1637, . . . 1552, 1080, 1527, 1111, 1593, 1114, 1715, 1157, 1781, 1226, 1790, 1256, 1771, 1246, 1724, 1224, 1657, 1225, 1569, 1246, 1461, 1269, 1381, 1321, 1406, 1365, 1484, 1356],
. . .
[1448, 1409, 1341, 1512, 1338, 1441, 1363, 1229, 1312, 1097, 1286, 1057, 1306, 1059, 1315, 1095, 1353, 1100, 1375, 1094, 1303, 1123, 1223, 1100, 1206, 1003, 1217, 941, 1213, 924, 1167, 906, 1123, 901, 1119, 932, 1056, 974, 922, 987, 881, 965, 956, 933, 994, 893, 969, 862, 987, 874, . . . −711, −586, −758, −692, −771, −808, −760, −815, −739, −724, −731, −699, −766, −783, −814, −860, −860, −857, −941, −781, −992, −676, −914, −635, −813, −649, −833], [−599, −895, −512, −883, −523, −819, −623, −789, −706, −846, −724, −925, −731, −922, −776, −852, −750, −757, −596, −679, −484, −666, −481, −621, −495, −508, −531, −511, −572, −632, −586, −667, −627, −590, −632, −485, −539, −431, −504, −506, −587, −611, −670, −656, −722, −770, −723, . . . −607−529, −587, −527, −565, −565, −516, −586, −417, −584, −340, −577, −343, −555, −359, −567, −334, −643, −315, −714, −336, −762, −386, −833, −437, −917, −464], [−1013, −517, −1111, −624, −1139, −702, −1108, −737, −1107, −783, −1131, −816, −1147, −840, −1175, −920, −1220, −1025, −1258, −1098, −1259, −1159, −1214, −1211,−1191, −1252, −1225, −1316, −1241−1385, −1206, −1426, −1184, −1441, −1178, −1423, −1135, −1365, −1072, −1308, −1031, −1268, . . . −1148, −491, −1108, −533, −1042, −599, −999, −649, −977, −695, −965, −737, −942, −760, −865, −782, −762, −805, −699, −812, −670, −804, −637, −790, −609, −788, −610]]

The array of sub-second audio segments in the example above is a truncated array with " . . . " indicating a truncation. An example representation of an array of dBFS values corresponding to their respective indexed sub-second audio segments is disclosed below.
[−52.421205219798, −59.52523486958484, −53.41464669335478, −50.78361198182752, −50.29522.587162349, −39.186260218094816, −36.618524211541505, . . . , 31.941761337405303, −35.127697326413234, −41.66183423232625]

The key moments engine then clusters 206 the array of dBFS values, for example, into five clusters using a k-means clustering algorithm. An example representation of five clusters generated by the key moments engine using the k-means clustering algorithm is disclosed below.
[[−27.58092973651456, −30.56461410103426, −30.995559274792225, −31.449006831873547, −31.090074784517725, −33.33290467815828, −33.01877707802652, −27.50512512762173, −33.58251638505932, −32.98325191751046, −32.80777343136036], [−34.01073507369288, −35.42313903674083, −37.559204108944144, −37.65985285549987, −34.37751203498576, −35.872786394943425, −36.77512650669703, −35.19150158574453, −35.055427424645636, −34.93623667424207, −34.117804406489, −34.731509259139564, −36.81177588443812, −35.80710827756498, −36.68417395168262, −38.03216226167297, −3.5.010.53900619659, −35.597020705230754, −35.70951298520325], [−41.30401653280713, −38.59978410902434, −39.01567741415257, −38.57725260575926], [−49.247429829525956, −49.247429829525956, −45.34953337195822], [−57.43994516947061, −50.663574038402984]]

By executing the k-means clustering algorithm on the array of dBFS values, the key moments engine renders five cluster centers around which the dBFS values are distributed. The lowest cluster center value corresponds to the loudest parts in the audio; the second lowest cluster center value corresponds to the second loudest part; and so on. The key moments engine uses these cluster centers to compute threshold values or threshold levels using which the dBFS values are classified 207, for example, into three categories. An example representation of threshold values computed by the key moments engine using the centers of the five clusters disclosed in the example above is {'high': −31.45502538, 'medium': −36.19210711}. The threshold value of "high" is the cluster center of the first cluster among the five clusters disclosed in the example above, and the threshold value of "medium" is the average of the cluster centers of the second cluster and the third cluster among the five clusters disclosed in the example above.

The key moments engine classifies any dBFS value above the high threshold value as a high audio level segment; any dBFS value between high and medium threshold values as a medium audio level segment; and all other dBFS values as low audio level segments. This skew in the classification criteria is because, in a typical video, the number of audio segments that have a low audio signal level is much higher than the number of audio segments that have high or medium audio signal levels. By using a skewed threshold computation, the key moments engine eliminates false positives in the identification of key moments. The key moments engine stores the classified dBFS values in another array of strings that are either "high", or "medium", or "low".

The key moments engine then iterates through the array of strings and identifies a starting point of an event on encountering a medium or high audio signal level. The key moments engine considers the event as ongoing until the key moments engine detects a low audio signal level in the array of strings and marks the detected low audio signal level as the end of the ongoing event. The key moments engine stores the start time code and the end time code of each event in an array for further processing and identification 208 of key moments from these events. An example representation of an array of start and end time codes of the events is as follows: [[34.0, 38.0], [63.0, 104.5], [123.5, 127.5], [136.5, 139.0], [148.5, 168.0], [255.25, 270.5], [282.75, 289.0]]

In an embodiment, the key moments engine determines if an event contains a high audio segment and discards any such events if the events contain only medium and low audio signal levels. The key moments engine then extracts the boundaries of accompanying elements, for example, songs and text credit scenes in the video and the events that overlap with these boundaries. While these video segments typically have high audio signal levels, they do not identify as good key moments as they are visually uninteresting. The key moments engine then merges 209 events that are closer to each other than a predetermined threshold duration, for example, 3 seconds. The key moments engine discards the events that are shorter than the minimum key moment duration, for example, 2 seconds, from the merged events. The key moments engine discards 210 isolated audio spikes. The key moments engine generates an array of key moments in the form of a start time code and an end time code for each key moment. An example representation of an array of key moments in the form of start and end time codes is: [[33.12, 38.88], [62.92, 105.48], [122.2, 128.8], [135.64, 141.88], [148.0, 168.16], [255.24, 270.68], [281.2, 292.32]]

The key moments engine then extracts shot boundaries from the video and adjusts 211 the key moments to fit to these shot boundaries. For each key moment, the key moments engine indicates the start time code as the start time code of a shot in which the key moment starts and the end time code as the end time code of the shot in which the key moment ends. The key moments engine discards fringe shots that end just before the start of a key moment, for example, of a 250-millisecond duration, or those fringe shots that start just after the key moment ends, for example, of a 250-millisecond duration, to avoid adding unnecessary shots to the key moment. The key moments engine creates a dictionary for each key moment to store audio signal levels, and the start time code and the end time code of each event. The key moments engine identifies and adds the shots that fall inside the key moments to the dictionary for the key moment. An example representation of a data structure of the dictionary for a key moment is disclosed below:

{'keyMoment': [593.0, 596.48], 'event': [593.25, 595.5], 'shots': [{'shot1': [593.0, 594.32]}, {'shot2': [594.32, 596.48]}],'levels': ['low', 'high', 'high', 'high', 'high', high', high', 'medium', 'medium', 'medium']} where the field "keyMoment" corresponds to start and end time codes of key moments fit to shot boundaries; the field "event" corresponds to start and end time codes of actual key moments; the field "shots" corresponds to the array of shots that fall under the key moment, each containing start and end time codes of the shot; and the field "levels" corresponds to audio signal levels of the sub-second audio segments in the key moment classified as low, medium, or high.

After the list of key moments are extracted from the audio file, the key moments engine ranks 212 each key moment in the list based on rules as disclosed in the detailed description of FIG. 4. The key moments engine computes the rank for each key moment based on ranking criteria comprising, for example, the presence of a key actor such as a protagonist, an antagonist, a celebrity playing a minor part in a single scene as a cameo, etc., the average value or audio signal level of the key moment, variations in audio signal levels of the key moment, etc. The key moments engine facilitates creation and updation of a database of key actors for identifying key actors from a video. The database of key actors is created and updated from the main cast of multiple different movies, television series, etc., whenever a new actor is introduced. Using this key actor database as a reference, in an embodiment, the key moments engine ranks the key moments with key actors higher than the key moments with a higher number of supporting cast as the supporting cast is not stored in the key actor database. Once the key moments have been ranked, the key moments engine plots 213 the audio of each key moment and each of the shots in the key moment for visualization, for example, on a vision cloud platform. The key moments engine uploads these audio plots, for example, to cloud storage and reports links to the audio plots back to the vision cloud platform along with the ranks, the start time codes, and the end time codes of the key moments. The key moments engine returns 214 the ranked key moments and their corresponding audio plots as the output and ends the process.

Figure 3:
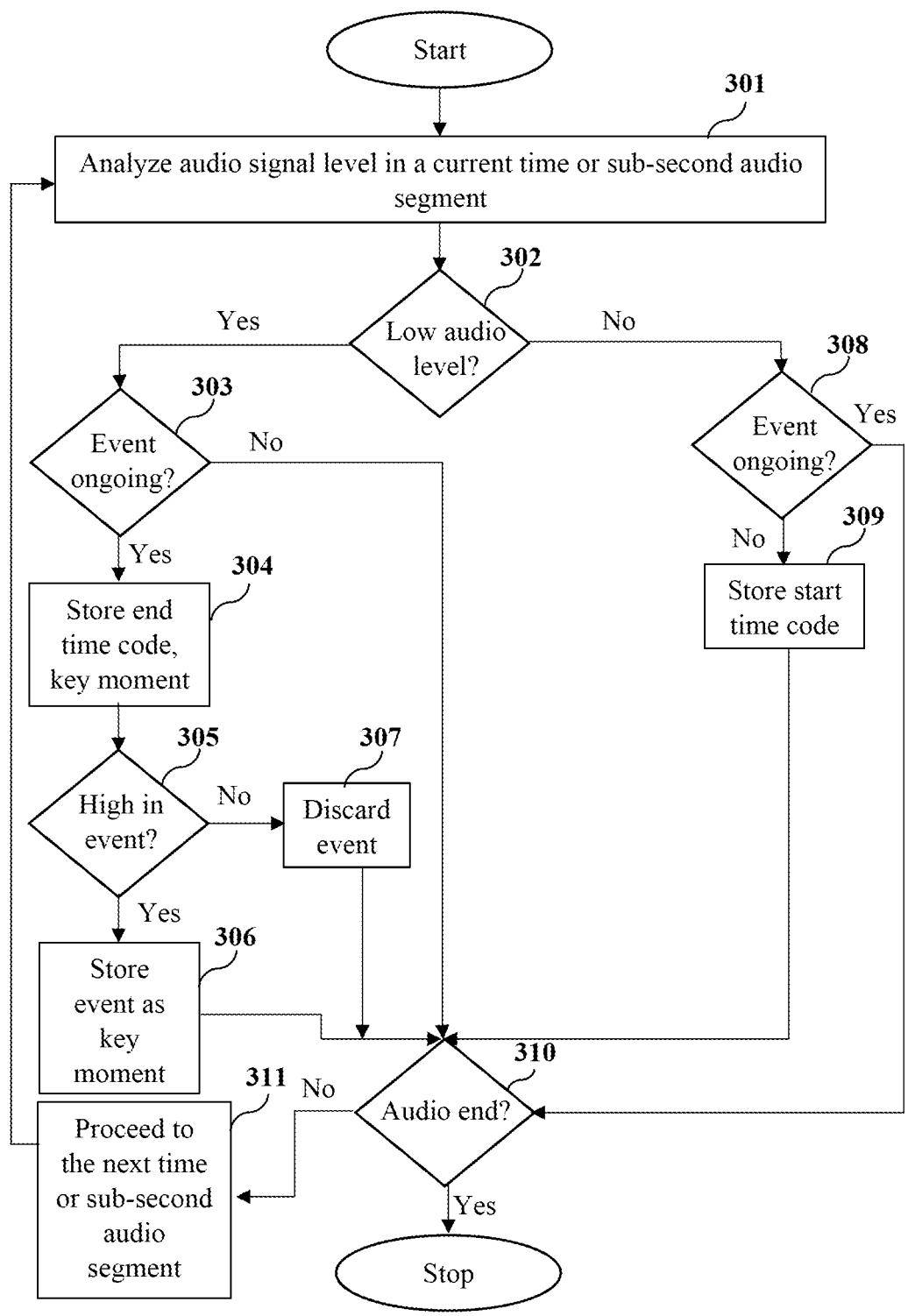
FIG. 3 illustrates a flowchart of a method for automatically identifying key moments in a video using audio signal levels of each sub-second audio segment of an audio file, according to an embodiment herein.

FIG. 3 illustrates a flowchart of a method for automatically identifying key moments in a video using audio signal levels of each sub-second audio segment of an audio file, according to an embodiment herein. After classifying the audio signal levels of an audio file extracted from the video as disclosed in the detailed description of FIG. 2, the key moments engine proceeds to identify key moments in the video. The key moments engine iterates through the array of strings output from the classification of the audio signal levels. The key moments engine analyzes 301 the audio signal level in a current time or sub-second audio segment and determines 302 whether a low audio signal level is encountered. If the key moments engine encounters a low audio signal level, the key moments engine determines 303 whether an event is ongoing. If the event is ongoing, the key moments engine stores 304 the end time code and key moment in an array. The key moments engine then determines 305 whether a high audio signal level is encountered in the event. If a high audio signal level is encountered in the event, the key moments engine stores 306 the event as a key moment and proceeds to step 310. If a high audio signal level is not encountered in the event, the key moments engine discards 307 the event and proceeds to step 310. If the event is not ongoing, the key moments engine proceeds to step 310.

At step 302, if the key moments engine encounters a medium audio signal level or a high audio signal level, the key moments engine determines 308 whether an event is ongoing. If the event is ongoing, the key moments engine proceeds to step 310. If the event is not ongoing, the key moments engine stores 309 the start time code and proceeds to step 310. At step 310, the key moments engine determines 310 whether the audio in the audio file has ended. If the audio in the audio file has not ended, the key moments engine proceeds 311 to the next time or sub-second audio segment for analysis 301. If the audio in the audio file has ended, the key moments engine ends the process.

The key moments engine maintains accuracy of the key moment identification process, for example, at a high 90s percentage, by the following methods in various embodiments. The key moments engine discards events that do not contain any high audio signal levels therein. For example, when there is an ambient noise in the background of a video during a mundane scene in the video, the audio is typically not used to draw attention of a viewer to what is happening in the video. By eliminating such events, the key moments engine eliminates most of the plain dialogue sections in the video.

Moreover, the key moments engine discards events that overlap, for example, with start credits and end credits of a video, because while background music is played during the start credits and the end credits of the video, the start credits and the end credits of the video do not constitute key moments. Discarding start credits also eliminates disclaimers at the beginning of the video as the disclaimers are typically very loud. The key moments engine also discards events that overlap, for example, with songs in the video, because while a song is an interesting part of the video, the song is not necessarily a key moment.

Furthermore, the key moments engine merges events that are too close to each other. This is helpful in marking some key moments as a single entity rather than a cluster of different events that occur one after the other. For example, in a scene with a gun fight where two parties take turns shooting at each other, there will be some audio segments with low audio levels in between two consecutive gun shots and that would mean that the event has ended. By merging the close by or proximal events, the key moments engine identifies a composite key moment that may contain all types of audio signal levels.

Furthermore, the key moments engine discards events that are too short in duration. After the events are merged, the key moments equine identifies the remaining events as key moments. However, the presence of key moments of too short duration in a video clip creates a jarring experience to a viewer watching these key moments, and hence the key moments engine discards any such clips that may potentially ruin the viewer's experience. Examples of the type of events that are discarded by the key moments engine are singular gun shots or other such similar audio spikes present in a video.

FIG. 4 illustrates a flowchart of a method for automatically ranking key moments identified in a video, according to an embodiment herein. After identification of the key moments as disclosed in the detailed description of FIGS. 2-3, the key moments engine proceeds to rank each of the identified key moments based on ranking criteria. The ranking criteria comprise, for example, an average audio signal level such as a decibels relative to full scale (dBFS) level of each key moment, presence of one or more key actors in each key moment determined using a reference database of key actors, and dBFS variations in each key moment. The key moments engine iterates through a list of key moments 401 identified in the video and computes a score for each key moment 402. Each of the ranking criteria adds weight to the score computed for the key moment as follows. In an embodiment, the weight for the presence of a key actor increases with the number of key actors in the key moment. The more the number of key actors, the higher the score for the key moment. The key moments engine computes the average value or audio signal level of the key moment by counting the number of high audio signal levels in the key moment. More the number of high audio signal levels in the key moment, the higher the score for the key moment. Regarding the variations in the audio signal levels of the key moment, if the audio signal levels remain constant at high, medium, or low, the key moments engine does not increase the score of the key moment. However, if the audio signal level changes from low to medium, or from low to high, or from medium to high, the key moments engine adds the difference in the dBFS values between the two sub-second audio segments to the score for the key moment. The key moments engine does not increment the score if the audio signal level changes the other way, that is, from medium to low, or from high to low, or from high to medium. The longer the audio signal level remains at high, the more the score gets incremented.

As exemplarily illustrated in FIG. 4, the key moments engine computes 403 the average dBFS level of the key moment. The key moments engine also determines 404 presence of one or more key actors in the key moment. If there are no key actors present in the key moment, the key moments engine proceeds to step 407. If there are one or more key actors present in the key moment, the key moments engine increments 406 a score assigned to the key moment. The key moments engine also calculates 405 dBFS variations in the key moment. After incrementing the score based on the above-mentioned ranking criteria, the key moments engine checks 407 whether the current key moment is the last key moment in the list. If there is another key moment in the list, the key moments engine proceeds to step 402 and repeats the process steps 403 through 406 to compute the score of each of the remaining key moments. The key moments engine computes the rank of the key moment by adding the scores generated for each of the ranking criteria and sorts the ranks in a descending order. Higher the score of the key moment, higher is the rank of the key moment. If there are no more key moments in the list, the key moments engine generates and returns 408 a ranked list of key moments, for example, on a user interface.

Figure 5:
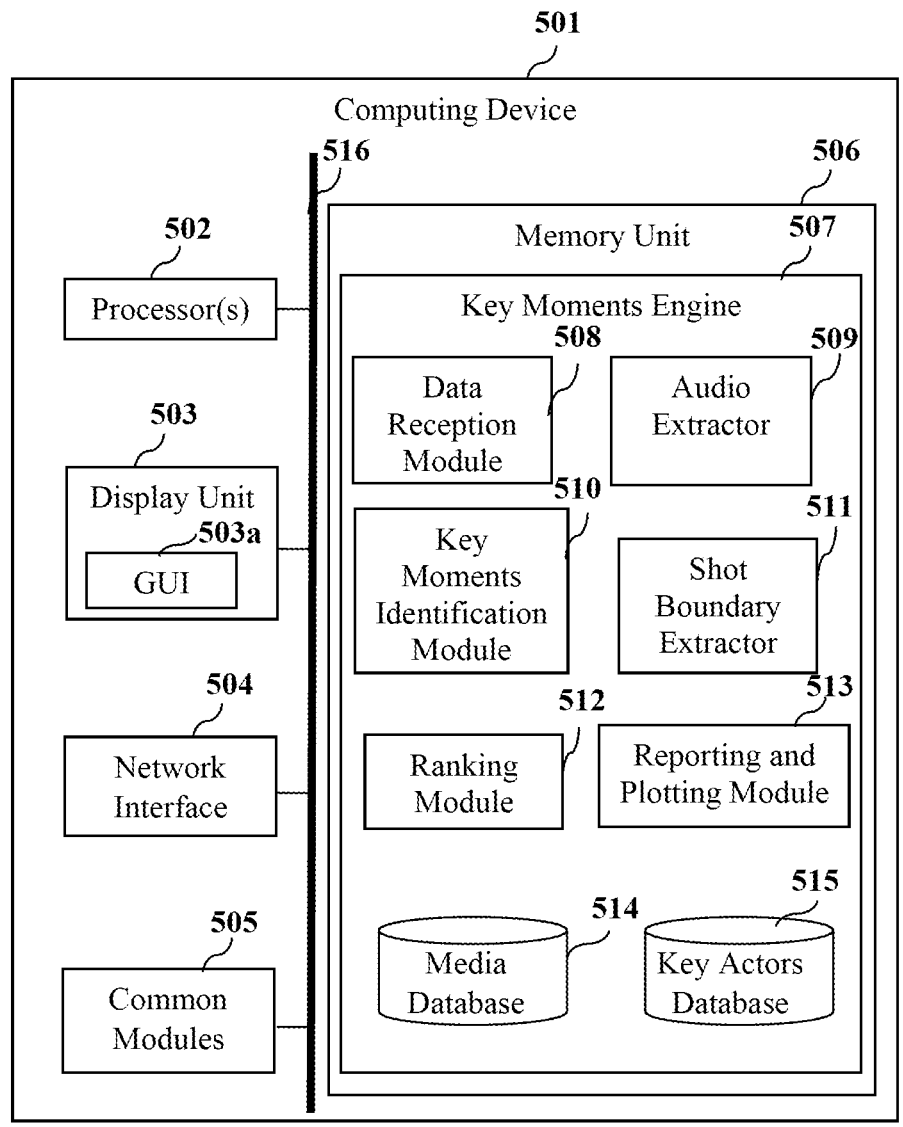
FIG. 5 illustrates an architectural block diagram of an exemplary implementation of a system comprising a key moments engine for automatically identifying and ranking key moments in a media asset, according to an embodiment herein.

FIG. 5 illustrates an architectural block diagram of an exemplary implementation of a system comprising the key moments engine 507 for automatically identifying and ranking key moments in a media asset, for example, a video, according to an embodiment herein. In an embodiment, the key moments engine 507 is deployed in a computing device 501 as illustrated in FIG. 5. The computing device 501 is a computer system programmable using high-level computer programming languages. The computing device 501 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a server, a portable electronic device, a network enabled computing device, an interactive network enabled communication device, an image capture device, any other suitable computing equipment, combinations of multiple pieces of computing equipment, etc. In an embodiment, the key moments engine 507 is implemented in the computing device 501 using programmed and purposeful hardware. In an embodiment, the key moments engine 507 is a computer-embeddable system that automatically identifies and ranks key moments in a media asset.

The key moments engine 507 in the computing device 501 communicates with a distributed streaming platform such as the Apache Kafka® platform for receiving messages for downloading media assets via a network, for example, a short-range network or a long-range network. The network is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

Figure 6:
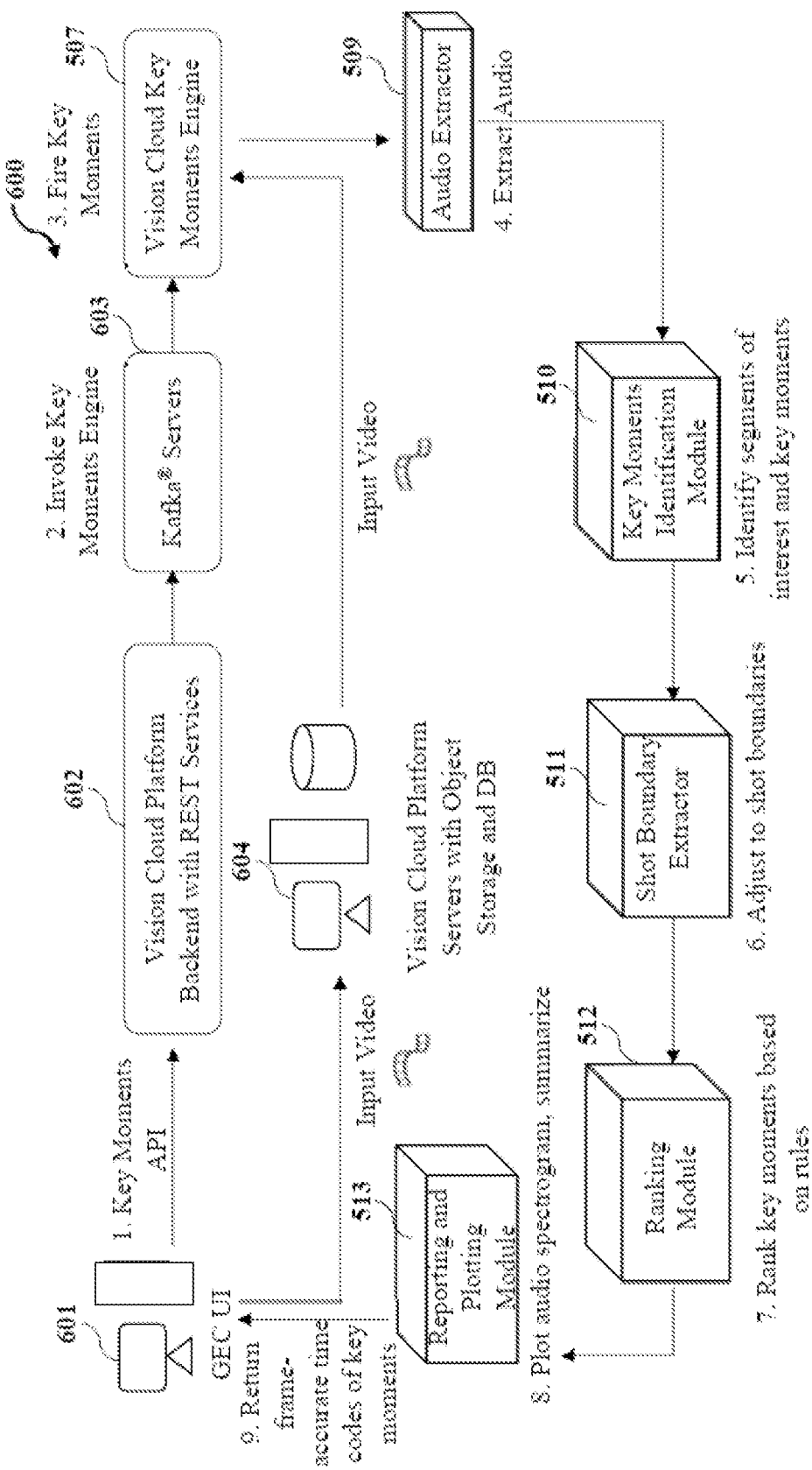
FIG. 6 illustrates a functional block diagram of an exemplary implementation of the system for automatically identifying and ranking key moments in a media asset, according to an embodiment herein.

In another embodiment, the key moments engine 507 is implemented in a cloud computing environment as disclosed in the detailed description of FIG. 6. As used herein, "cloud computing environment" refers to a processing environment comprising configurable computing physical and logical resources, for example, networks, servers, storage media, virtual machines, applications, services, etc., and data distributed over the network. The cloud computing environment provides an on-demand network access to a shared pool of the configurable computing physical and logical resources. In an embodiment, the key moments engine 507 is a cloud computing-based platform implemented as a service for automatically identifying and ranking key moments in a media asset. In another embodiment, the key moments engine 507 is implemented as an on-premise platform comprising on-premise software installed and run on client systems on the premises of an organization.

As illustrated in FIG. 5, the computing device 501 comprises a non-transitory, computer-readable storage medium, for example, a memory unit 506, for storing computer program instructions defined by modules, for example, 508, 509, 510, 511, 512, 513, etc., of the key moments engine 507. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 501 further comprises at least one of multiple processors 502 operably and communicatively coupled to the memory unit 506 for executing the computer program instructions defined by the modules, for example, 508, 509, 510, 511, 512, 513, etc., of the key moments engine 507. The memory unit 506 is used for storing program instructions, applications, and data. In an embodiment, the memory unit 506 is a random-access memory (RAM) or another type of dynamic storage device that stores information and instructions for execution by the processor(s) 502. The memory unit 506 also stores temporary variables and other intermediate information used during execution of the instructions by the processor(s) 502. In an embodiment, the computing device 501 further comprises a read only memory (ROM) or other types of static storage devices that store static information and instructions for execution by the processor(s) 502. In an embodiment, the modules, for example, 508, 509, 510, 511, 512, 513, 514, 515, etc., of the key moments engine 507 are stored in the memory unit 506.

The processor(s) 502 is configured to execute the computer program instructions defined by the modules, for example, 508, 509, 510, 511, 512, 513, etc., of the key moments engine 507 for automatically identifying and ranking key moments in a media asset. The modules, for example, 508, 509, 510, 511, 512, 513, etc., of the key moments engine 507, when loaded into the memory unit 506 and executed by the processor(s) 502, transform the computing device 501 into a specially-programmed, special purpose computing device configured to implement the functionality disclosed herein. The processor(s) 502 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor(s) 502 is implemented as a processor set comprising, for example, a programmed microprocessor and a math or graphics co-processor. The key moments engine 507 is not limited to employing the processor(s) 502. In an embodiment, the key moments engine 507 employs controllers or microcontrollers. The processor(s) 502 executes the modules, for example, 508, 509, 510, 511, 512, 513, etc., of the key moments engine 507.

As illustrated in FIG. 5, the computing device 501 further comprises a data bus 516, a display unit 503, a network interface 504, and common modules 505. The data bus 516 permits communications between the modules, for example, 502, 503, 504, 505, and 506 of the computing device 501. The display unit 503, via a graphical user interface (GUI) 503a, displays information, images, videos, display interfaces, user interface elements such as checkboxes, input text fields, filters, etc., for example, for allowing a user to visualize a ranked list of key moments. In an embodiment, the key moments engine 507 renders the GUI 503a on the display unit 503 for receiving inputs from the user. The GUI 503a comprises, for example, an online web interface, a web-based downloadable application interface, a mobile-based downloadable application interface, etc.

The network interface 504 enables connection of the computing device 501 to the network. In an embodiment, the network interface 504 is provided as an interface card also referred to as a line card. The network interface 504 is, for example, one or more of infrared interfaces, interfaces implementing of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 505 of the computing device 501 comprise, for example, input/output (I/O) controllers, input devices, output devices, fixed media drives such as hard drives, removable media drives for receiving removable media, etc. Computer applications and programs are used for operating the computing device 501. The programs are loaded onto fixed media drives and into the memory unit 506 via the removable media drives. In an embodiment, the computer applications and programs are loaded into the memory unit 506 directly via the network.

In an exemplary implementation illustrated in FIG. 5, the key moments engine 507 comprises a data reception module 508, an audio extractor 509, a key moments identification module 510, a shot boundary extractor 511, a ranking module 512, a reporting and plotting module 513, and optionally a media database 514, stored in the memory unit 506 and executed by the processor(s) 502 in the computing device 501. The data reception module 508 receives an input message requesting for identification and ranking of key moments in a media asset. The input message comprises relevant data, for example, one or more links to download the media asset, for example, from a distributed streaming platform such as the Apache Kafka® platform, and process details. The data reception module 508 downloads the media asset from the distributed streaming platform and stores the media asset in the media database 514. The audio extractor 509 extracts an audio stream from the media asset and stores the audio stream as an audio file. The audio extractor 509 divides the audio file into sub-second audio segments. The audio extractor 509 computes an audio signal level for each of the sub-second audio segments and generates an array of audio signal levels for the audio file as disclosed in the detailed description of FIG. 2. The audio extractor 509 generates clusters of the audio signal levels from the array of audio signal levels by executing at least one clustering algorithm, for example, a k-means clustering algorithm, as disclosed in the detailed description of FIG. 2. In an embodiment, the audio extractor 509 stores the audio signal level as an absolute value of the audio signal level for the generation of the clusters free of errors as disclosed in the detailed description of FIG. 2. The audio extractor 509 dynamically determines threshold levels for classifying the audio signal levels in the array using the clusters as disclosed in the detailed description of FIG. 2. The audio extractor 509 classifies the audio signal levels, for example, as high audio signal levels, or medium audio signal levels, or low audio signal levels.

The key moments identification module 510 identifies the key moments from the classified audio signal levels as follows. In an embodiment, the key moments identification module 510 analyzes the audio signal levels comprising an array of events. The key moments identification module 510 identifies a medium audio signal level or a high audio signal level as a starting point of each of the events. The key moments identification module 510 identifies an end point of each of the events on detecting a low audio signal level in the array. The key moments identification module 510 processes the events for identifying the key moments by performing one or more of the following steps: (a) discarding events containing only medium audio signal levels and low audio signal levels, from the array of events; (b) discarding events that overlap boundaries of accompanying elements of the media asset, from the array of events, where the accompanying elements of the media asset comprise, for example, songs, start credits, and end credits of the media asset; (c) merging one or more of the events that are closer to each other in relation to a predetermined duration; and (d) discarding events that are short in duration from the array of events. In an embodiment, the key moments identification module 510 processes events with non-distinguishable audio signal levels for the identification of the key moments as disclosed in the detailed description of FIG. 1.

In an embodiment, the key moments identification module 510 creates a dictionary for each of the identified key moments for storing the audio signal levels of audio segments in each of the identified key moments, and a start time code and an end time code of an event defining each of the identified key moments. The dictionary comprises shots that fall inside each of the identified key moments. In an embodiment, the key moments identification module 510 represents each of the identified key moments using a start time code and an end time code. In an embodiment, the key moments identification module 510 adjusts the start time code and the end time code of each of the identified key moments to boundaries of shots of the media asset to enhance a visual representation of the identified key moments. In an embodiment, the key moments identification module 510 discards fringe shots that end just before the start time code of each of the identified key moments and fringe shots that start just after the end time code of each of the identified key moments.

The ranking module 512 computes a rank for each of the identified key moments based on ranking criteria as disclosed in the detailed descriptions of FIG. 1 and FIG. 4. In an embodiment, the reporting and plotting module 513 generates a report comprising an audio plot of each of the identified key moments and the shots in each of the identified key moments as exemplarily illustrated in FIGS. 7A-7B, the computed rank of each of the identified key moments, and a start time code and an end time code of each of the identified key moments.

In an embodiment, the key moments engine 507 further comprises a key actors database 515 for storing information of multiple actors from the main cast of multiple different movies and television series. The key moments identification module 510 utilizes the key actors database 515 as a reference for identifying key actors from a video. In an embodiment, the ranking module 512 communicates with the key actors database 515 to identify key actors in the key moments identified by the key moments identification module 510 for ranking the key moments with the key actors higher than the key moments with a high number of supporting cast, as information of actors from the supporting cast is not stored in the key actors database 515. Each of the databases in the system, for example, the media database 514 and the key actors database 515, refers to any storage area or medium that can be used for storing data and media assets. In an embodiment, each of the databases 514 and 515 is any of a structured query language (SQL) database or a not only SQL (NoSQL) database. In an embodiment, each of the databases 514 and 515 is a location on a file system. In another embodiment, each of the databases 514 and 515 is configured to be remotely accessible by the key moments engine 507 in the computing device 501 via the network. In another embodiment, each of the databases 514 and 515 is configured as a cloud-based database implemented in a cloud computing environment.

The processor(s) 502 retrieves instructions defined by the data reception module 508, the audio extractor 509, the key moments identification module 510, the shot boundary extractor 511, the ranking module 512, and the reporting and plotting module 513 from the memory unit 506 for performing respective functions disclosed above. The data reception module 508, the audio extractor 509, the key moments identification module 510, the shot boundary extractor 511, the ranking module 512, and the reporting and plotting module 513 of the key moments engine 507 are disclosed above as software executed by the processor(s) 502. In an embodiment, the modules, for example, 508, 509, 510, 511, 512, 513, etc., of the key moments engine 507 are implemented completely in hardware. In another embodiment, the modules, for example, 508, 509, 510, 511, 512, 513, etc., of the key moments engine 507 are implemented by logic circuits to carry out their respective functions disclosed above. In another embodiment, the key moments engine 507 is also implemented as a combination of hardware and software and one or more processors, for example, 502, that are used to implement the modules, for example, 508, 509, 510, 511, 512, 513, etc., of the key moments engine 507.

For purposes of illustration, the detailed description refers to the modules, for example, 508, 509, 510, 511, 512, 513, 514, 515, etc., of the key moments engine 507 being run locally on a single computing device 501; however the scope of the system and the method disclosed herein is not limited to the modules, for example, 508, 509, 510, 511, 512, 513, 514, 515, etc., of the key moments engine 507 being run locally on a single computing device 501 via the operating system and the processor(s) 502, but may be extended to run remotely over the network by employing a web browser and a remote server, a mobile phone, or other electronic devices. In an embodiment, one or more portions of the system disclosed herein are distributed across one or more computer systems (not shown) coupled to the network.

The non-transitory, computer-readable storage medium disclosed herein stores computer program instructions executable by the processor(s) 502 for automatically identifying and ranking key moments in a media asset. The computer program instructions implement the processes of various embodiments disclosed above and perform additional steps that may be required and contemplated for automatically identifying and ranking key moments in a media asset. When the computer program instructions are executed by the processor(s) 502, the computer program instructions cause the processor(s) 502 to perform the steps of the method for automatically identifying and ranking key moments in a media asset as disclosed in the detailed descriptions of FIGS. 1-4. In an embodiment, a single piece of computer program code comprising computer program instructions performs one or more steps of the method disclosed in the detailed descriptions of FIGS. 1-4. The processor(s) 502 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, Microsoft® .NET, Objective-C®, etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

FIG. 6 illustrates a functional block diagram of an exemplary implementation of the system 600 for automatically identifying and ranking key moments in a media asset, according to an embodiment herein. In this exemplarily implementation, the system 600 disclosed herein comprises a vision cloud platform 601 with a general entertainment content (GEC) user interface (UI), a vision cloud backend engine 602 with representational state transfer (REST) servers, vision cloud platform servers 604 with object storage and databases, Kafka® servers 603, and the key moments engine 507. The key moments engine 507 is implemented on a vision cloud, that is, a consortium of artificial intelligence (AI)-powered services hosted on cloud servers. Media assets are typically uploaded to the cloud and a request for invoking the key moments identification process is received by the key moments engine 507 through a messaging service, for example, a Kafka® messaging service executed by the Kafka® servers 603. In the key moments identification process, the key moments engine 507 parses an audio stream of a video file into interesting events, herein referred to as "key moments", based on their audio signal levels at a given point in time. The key moments engine 507 invokes various services depending upon the process requirements to generate start and end time codes for the key moments.

On receiving the request and downloading a media asset, for example, a video file, for identification of key moments therein, the audio extractor 509 extracts the audio stream in the video file as a separate audio file. The audio extractor 509 then reads the audio file and records audio signal levels, for example, decibels relative to full scale (dBFS) levels at each point of the audio file by dividing the audio file into sub-second audio segments or intervals. The audio extractor 509 then clusters the dBFS levels into groups or clusters based on the difference in the dBFS levels and uses the cluster centers to determine threshold levels for classification of the dBFS levels as high, medium, or low. In an embodiment, the key moments identification module 510, in communication with the audio extractor 509, collects the high dBFS levels in the sub-second audio segments and identifies segments of interest and key moments as disclosed in the detailed descriptions of FIGS. 1-3. The shot boundary extractor 511 adjusts the start and end time codes of the key moments to shot boundaries to make the key moments visually appeasing. Once the key moments are identified, the ranking module 512 ranks each key moment based on rules, for example, the variations in the dBFS levels, the presence of key actors in the key moment, the average dBFS level of the key moment, etc., as disclosed in the detailed description of FIG. 4.

After ranking is performed, the reporting and plotting module 513 plots the audio of each key moment as a spectrogram for visualization purposes. The key moments identification module 510 stores the start and end time codes of the key moments in a database along with the audio plot of the key moments. In an embodiment, the ranking module 512 displays the ranked list of key moments on a graphical user interface for visualization. In an embodiment, the reporting and plotting module 513 returns frame-accurate time codes of the key moments to the vision cloud platform 601. The reporting and plotting module 513 also sends an array of dictionaries that contains the details of the key moments to the vision cloud platform 601 using representational state transfer (REST) application programming interfaces (API) credentials in the initial Kafka® message received by the key moments engine 507. An example representation of the array of dictionaries that is sent to the vision cloud platform 601 is disclosed below:

[{"end": 32.8, start": 0.0, "peakDrop": 30.75, "peakStart": 0.0, "rank": 4, "plotUrl": "path/to/cloud/audioPlot.png", "shots": [{"end": 2.92, "start": 0.0, "plotUrl": "path/to/cloud/audioPlotShot1.png" }, {"end": 11.84, "start": 2.92, "plotUrl": "path/to/cloud/audioPlotShot2.png", {"end": 32.8, "start": 11.84, "plotUrl": "path/to/cloud/audioShot3.png"{]}, { . . . }, { . . . }]

where the fields "end" and "start" refer to the points in seconds when the key moment ends and starts respectively, after these points are fit to shot boundaries; "peakDrop" and "peakStart" refer to the points in seconds when the key moment ends and starts respectively; "rank" refers to an integer that represents how high the key moment is ranked by the ranking module 512; "plotUrl" refers to a link to the audio plot of the key moment uploaded to a binary large object (BLOB); and "shots" refers to an array that contains start and end time codes of each shot in the key moment along with the link to the audio plot for that shot. The vision cloud platform 601 accesses these details to cut the video in the video file into frame-accurate key moments along with the audio plot of each key moment.

Figure 7A:
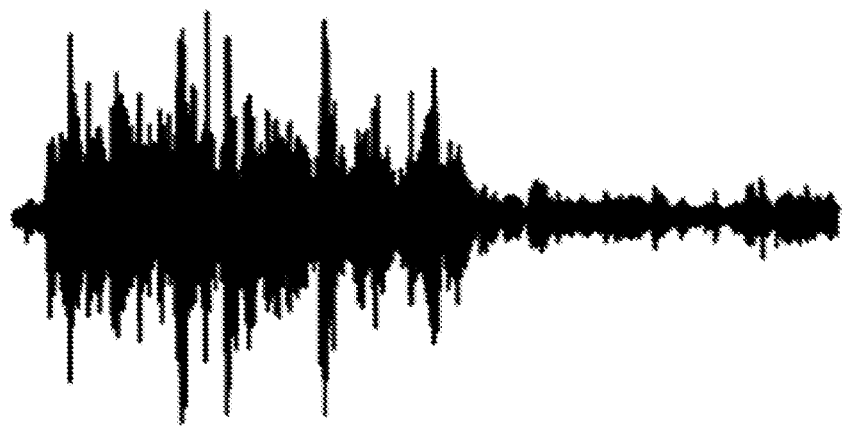
FIG. 7A exemplarily illustrates an audio plot of a key moment identified by the key moments engine, according to an embodiment herein.
Figure 7B:
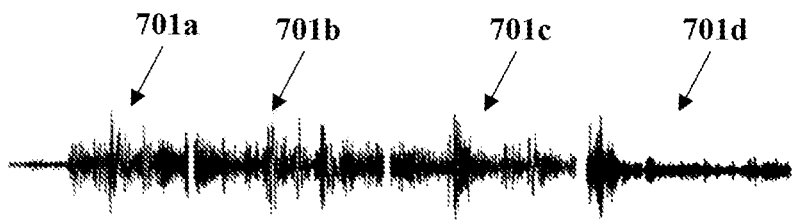
FIG. 7B exemplarily illustrates an audio plot of shots constituting the key moment shown in FIG. 7A, according to an embodiment herein.

FIG. 7A exemplarily illustrates an audio plot of a key moment identified by the key moments engine, according to an embodiment herein. As exemplarily illustrated in FIG. 7A, the audio plot of a key moment spans across four shots. Th audio plot of the key moment exemplarily illustrated in FIG. 7A starts in shot "n" and ends in shot "n+3". The audio plot starts when the audio signal level jumps to high and ends when the audio signal level drops to low. FIG. 7A exemplarily illustrates the audio plot of the key moment before the key moment is fit to shot boundaries. FIG. 7B exemplarily illustrates an audio plot of shots 701a, 701b, 701c, and 701d constituting the key moment shown in FIG. 7A, according to an embodiment herein. FIG. 7B shows the audio plots of the shots, that is, shot n 701a, shot n+1 701b, shot n±2 701c, and shot n+3 701d in, the key moment after the key moment is fit to shot boundaries.

The key moments engine implemented by the system and the method disclosed herein identifies key moments in a media asset, for example, a video, based on an audio stream. When a video reaches an interesting event, the interesting event is typically accompanied by a change in background music, which is identified by determining changes in the audio signal levels. The key moments engine, therefore, automates the process of identifying key moments in the video by identifying changes in the audio signal levels. Moreover, by dynamically determining threshold levels, the key moments engine ensures that each video is treated fairly such that there is no manual intervention, which also ensures that at least one key moment is identified in a video. The key moments engine identifies and ranks key moments in videos that are music heavy and have different threshold levels as well as videos that use music only for dramatic effect. In an embodiment, the key moments engine determines the threshold levels solely based on audio signal levels in that video and no other input.

Furthermore, considering that a video segment of interest will have steady and continuous background music rather than stray audio spikes, the key moments engine accounts for false positives produced by audio segments, for example, closeup dialogues, songs, stray spikes in audio, and other such similar audio events, by merging some audio events that satisfy preconfigured rules and discarding the audio events that do not satisfy the preconfigured rules as disclosed in the detailed descriptions of FIGS. 2-3. Furthermore, by creating and maintaining a database of key actors, that is, the key actors database, from across different videos, the key moments engine ranks the key moments that have a higher number of key actors higher than the key moments with more supporting cast. The higher ranked key moments comprise, for example, cameos by famous actors as mostly well-known actors make guest appearances, and hence are picked up from the video. By executing a rule-based ranking algorithm on the identified key moments as disclosed in the detailed description of FIG. 4, the key moments engine ensures that only the best key moments are pushed up through the order while pushing down false positives and stray music spikes. The key moments engine also ensures that the key moments that contain only closeup dialogues are ranked lower as the audio fluctuation does not follow any pattern.

The automated system and method disclosed herein substantially eases video browsing and expensive supervision requirements by automatically identifying and ranking the key moments in the video to be used in the creation of a trailer or other types of promotional content. The machine intelligence-based key moment identification process implemented by the key moments engine reduces human hours required for creating trailers or promo videos for any new content while allowing quick creation of multiple such videos for advertisement of the content. Reduced human hours per trailer or promo video results in an increase in the number of trailers or promo videos that can be created for different target audiences in a short duration. The audio processing executed by the key moments engine reduces the amount of processing power required to identify the key moments in the video Ranking the identified key moments further reduces the workload of media creators as the key moments engine renders a ranked list of key moments for convenient selection.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the methods disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the embodiments disclosed herein are implemented in a non-programmed environment comprising documents created, for example, in a hypertext markup language (HTML), an extensible markup language (XML), or other format that render aspects of a GUI or perform other functions, when viewed in a visual area or a window of a browser program. Various aspects of the embodiments disclosed herein are implemented as programmed elements, or non-programmed elements, or any suitable combination thereof.

Where databases are described such as the media database 514 and the key actors database 515 illustrated in FIG. 5, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The foregoing examples and illustrative implementations of various embodiments have been provided merely for explanation and are in no way to be construed as limiting of the embodiments disclosed herein. While the embodiments have been described with reference to various illustrative implementations and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be executed and changes may be made thereto, without departing from the scope and spirit of the embodiments disclosed herein.

What is claimed is:

1. A system for automatically identifying and ranking key moments in a media asset, the system comprising:
    at least one processor;
    a non-transitory, computer-readable storage medium operably and communicatively coupled to the at least one processor and configured to store the media asset and computer program instructions executable by the at least one processor; and
    a key moments engine configured to define the computer program instructions, which when executed by the at least one processor, cause the at least one processor to:
    extract an audio stream from the media asset and store the audio stream as an audio file;
    divide the audio file into sub-second audio segments;
    compute an audio signal level for each of the sub-second audio segments and generate an array of audio signal levels for the audio file;
    generate clusters of the audio signal levels from the array of audio signal levels;
    dynamically determine threshold levels for classifying the audio signal levels in the array using the clusters;
    identify the key moments from the classified audio signal levels; and
    compute a rank for each of the identified key moments based on ranking criteria;
    wherein, for the identification of the key moments from the classified audio signal levels, one or more of the computer program instructions, which when executed by the at least one processor, cause the at least one processor to:
    analyze the classified audio signal levels comprising an array of events, wherein one of a medium one of the classified audio signal levels and a high one of the classified audio signal levels is identified as a starting point of each of the events, and wherein an end point of the each of the events is identified on detecting a low one of the classified audio signal levels in the array;
    process the events for identifying the key moments by performing one or more of:
    discarding events containing only medium audio signal levels and low audio signal levels, from the array of events;
    discarding events that overlap boundaries of accompanying elements of the media asset, from the array of events, wherein the accompanying, elements of the media asset comprise songs, start credits, and end credits of the media asset;
    merging one or more of the events that are closer to each other in relation to a predetermined duration; and
    discarding events that are short in duration from the array of events.

2. The system of claim 1, wherein the audio signal level is measured in decibels relative to full scale.

3. The system of claim 1, wherein one or more of the computer program instructions, which when executed by the at least one processor, cause the at least one processor to store the audio signal level as an absolute value of the audio signal level for the generation of the clusters free of errors.

4. The system of claim 1, wherein the key moments engine is configured to execute at least one of a plurality of clustering algorithms for generating the clusters of the audio signal levels, wherein the at least one of the clustering algorithms is a k-means clustering algorithm.

5. The system of claim 1, wherein the audio signal levels are classified as one of high audio signal levels, medium audio signal levels, and low audio signal levels.

6. The system of claim 1, wherein one or more of the computer program instructions, which when executed by the at least one processor, cause the at least one processor to process events with non-distinguishable audio signal levels for the identification of the key moments.

7. The system of claim 1, wherein one or more of the computer program instructions, which when executed by the at least one processor, cause the at least one processor to represent the each of the identified key moments using a start time code and an end time code.

8. The system of claim 7, wherein one or more of the computer program instructions, which when executed by the at least one processor, cause the at least one processor to adjust the start time code and the end time code of the each of the identified key moments to boundaries of shots of the media asset to enhance a visual representation of the identified key moments.

9. The system of claim 7, wherein one or more of the computer program instructions, which when executed by the at least one processor, cause the at least one processor to discard fringe shots that end just before the start time code of the each of the identified key moments and fringe shots that start just after the end time code of the each of the identified key moments.

10. The system of claim 1, wherein one or more of the computer program instructions, which when executed by the at least one processor, cause the at least one processor to create a dictionary for the each of the identified key moments for storing the audio signal levels of audio segments in the each of the identified key moments, and a start time code and an end time code of an event defining the each of the identified key moments, wherein the dictionary comprises shots that fall inside the each of the identified key moments.

11. The system of claim 1, wherein the ranking criteria comprise one or more of variations in the audio signal levels of the identified key moments, presence of one or more key actors in the media asset determined using a reference database of key actors, presence of scenes of interest in the media asset, and an average audio signal level of the each of the identified key moments.

12. The system of claim 1, wherein one or more of the computer program instructions, which when executed by the at least one processor, cause the at least one processor to generate a report comprising an audio plot of the each of the identified key moments and the shots in the each of the identified key moments, the computed rank of the each of the identified key moments, and a start time code and an end time code of the each of the identified key moments.

13. A method executed by a key moments engine operably coupled to at least one processor for automatically identifying and ranking key moments in a media asset, the method comprising:
  extracting an audio stream from the media asset and storing the audio stream as an audio file;
  dividing the audio file into sub-second audio segments;
  computing an audio signal level for each of the sub-second audio segments and generating an array of audio signal levels for the audio file;
  generating clusters of the audio signal levels from the array of audio signal levels;
  dynamically determining threshold levels for classifying the audio signal levels in the array using the clusters;
  identifying the key moments from the classified audio signal levels; and
  computing a rank for each of the identified key moments based on ranking criteria;
    wherein the identification of the key moments from the classified audio signal levels comprises:
  analyzing the classified audio signal levels comprising an array of events by the key moments engine, wherein one of a medium one of the classified audio signal levels and a high one of the classified audio signal levels is identified as a starting point of each of the events, and wherein an end point of the each of the events is identified on detecting a low one of the classified audio signal levels in the array;
  processing the events for identifying the key moments by performing one or more of:
    discarding events containing only medium audio signal levels and low audio signal levels, from the array of events, by the key moments engine;
    discarding events that overlap boundaries of accompanying elements of the media asset, from the array of events, by the key moments engine, wherein the accompanying elements of the media asset comprise songs, start credits, and end credits of the media asset;
    merging one or more of the events that are closer to each other in relation to a predetermined duration by the key moments engine; and
    discarding events that are short in duration from the array of events by the key moments engine.

14. The method of claim 13, wherein the audio signal level is measured in decibels relative to full scale.

15. The method of claim 13, further comprising storing the audio signal level as an absolute value of the audio signal level by the key moments engine for the generation of the clusters free of errors.

16. The method of claim 13, wherein the key moments engine is configured to execute at least one of a plurality of clustering algorithms for generating the clusters of the audio signal levels, wherein the at least one of the clustering algorithms is a k-means clustering algorithm.

17. The method of claim 13, wherein the audio signal levels are classified as one of high audio signal levels, medium audio signal levels, and low audio signal levels.

18. The method of claim 13, further comprising processing events with non-distinguishable audio signal levels by the key moments engine for the identification of the key moments.

19. The method of claim 13, further comprising representing the each of the identified key moments using a start time code and an end time code by the key moments engine.

20. The method of claim 19, further comprising adjusting the start time code and the end time code of the each of the identified key moments to boundaries of shots of the media asset by the key moments engine to enhance a visual representation of the identified key moments.

21. The method of claim 19, further comprising discarding, by the key moments engine, fringe shots that end just before the start time code of the each of the identified key moments and fringe shots that start just after the end time code of the each of the identified key moments.

22. The method of claim 13, further comprising creating a dictionary for the each of the identified key moments by the key moments engine for storing the audio signal levels of audio segments in the each of the identified key moments, and a start time code and an end time code of an event defining the each of the identified key moments, wherein the dictionary comprises shots that fall inside the each of the identified key moments.

23. The method of claim 13, wherein the ranking criteria comprise one or more of variations in the audio signal levels of the identified key moments, presence of one or more key actors in the media asset determined using a reference database of key actors, presence of scenes of interest in the media asset, and an average audio signal level of the each of the identified key moments.

24. The method of claim 13, further comprising generating, by the key moments engine, a report comprising an audio plot of the each of the identified key moments and the shots in the each of the identified key moments, the computed rank of the each of the identified key moments, and a start time code and an end time code of the each of the identified key moments.

* * * * *